United States Patent
de Lacheze-Murel et al.

(10) Patent No.: US 10,440,505 B2
(45) Date of Patent: Oct. 8, 2019

(54) PASSIVE AND ACTIVE TECHNIQUES FOR PEOPLE-COUNTING

(71) Applicant: Bluefox, Inc., Sunnyvale, CA (US)

(72) Inventors: Thibault de Lacheze-Murel, San Mateo, CA (US); Jan Willem Korver, AC Utrecht (NL); Paul-Ambroise Augustin Duquenne, Versailles (FR)

(73) Assignee: BLUEFOX, INC., Sunnyvale, CA (US)

( * ) Notice: Subject to any disclaimer, the term of this patent is extended or adjusted under 35 U.S.C. 154(b) by 7 days.

(21) Appl. No.: 15/823,478

(22) Filed: Nov. 27, 2017

(65) Prior Publication Data

US 2019/0166454 A1 May 30, 2019

(51) Int. Cl.
| | |
|---|---|
| *H04W 24/00* | (2009.01) |
| *H04W 4/021* | (2018.01) |
| *H04W 4/02* | (2018.01) |
| *H04W 4/08* | (2009.01) |
| *H04W 8/22* | (2009.01) |
| *H04L 12/26* | (2006.01) |
| *H04W 8/18* | (2009.01) |
| *H04L 29/06* | (2006.01) |

(52) U.S. Cl.
CPC ............ *H04W 4/021* (2013.01); *H04L 43/12* (2013.01); *H04W 4/023* (2013.01); *H04W 4/08* (2013.01); *H04W 8/186* (2013.01); *H04W 8/22* (2013.01); *H04L 63/08* (2013.01)

(58) Field of Classification Search
CPC ....... H04W 4/021; H04W 4/023; H04W 4/08; H04W 8/186; H04W 8/22; H04W 48/14; H04W 84/12; H04L 43/12; H04L 63/08; H04L 41/0853; H04L 61/6022
See application file for complete search history.

(56) References Cited

U.S. PATENT DOCUMENTS

| | | | | |
|---|---|---|---|---|
| 2013/0273938 | A1* | 10/2013 | Ng | H04W 64/00 455/456.1 |
| 2017/0012935 | A1* | 1/2017 | Raman | G06F 16/951 |
| 2017/0041744 | A1* | 2/2017 | McKay | H04W 4/021 |
| 2017/0257821 | A1* | 9/2017 | Smith | H04W 48/16 |
| 2018/0077572 | A1* | 3/2018 | Trappitt | H04L 67/20 |

* cited by examiner

*Primary Examiner* — Barry W Taylor

(57) ABSTRACT

Disclosed herein is a people-counting system that counts people in a given area based on the signals that are emitted by the respective people's mobile devices, such as cell phones. In order to count passively, the system receives and analyzes network probes transmitted by the wireless devices and correlates groups of fake machine identifiers in order to identify a given device. Where this passive approach is unsuccessful, or determined low certainty, an active approach involving data layer packets such as: CTS/RTS, authentication and dissociation packets. Device's response or lack thereof is analyzed to provide further accuracy to a local device count.

18 Claims, 5 Drawing Sheets

```
IEEE 802.11 Probe Request, Flags: ........C
    Type/Subtype: Probe Request (0x0004)
  > Frame Control Field: 0x4000
    .000 0000 0000 0000 = Duration: 0 microseconds
    Receiver address: Broadcast (ff:ff:ff:ff:ff:ff)
    Destination address: Broadcast (ff:ff:ff:ff:ff:ff)
    Transmitter address: 76:a5:17:35:5f:05 (76:a5:17:35:5f:05)
    Source address: 76:a5:17:35:5f:05 (76:a5:17:35:5f:05)
    BSS Id: Broadcast (ff:ff:ff:ff:ff:ff)
    .... .... .... 0000 = Fragment number: 0
    0111 1001 0010 .... = Sequence number: 1938
    Frame check sequence: 0xee310b2d [correct]
    [FCS Status: Good]
IEEE 802.11 wireless LAN management frame
  ▼ Tagged parameters (135 bytes)
    > Tag: SSID parameter set: Broadcast
    > Tag: Supported Rates 6, 9, 12, 18, 24, 36, 48, 54, [Mbit/sec]
    > Tag: HT Capabilities (802.11n D1.10)
    > Tag: Extended Capabilities (4 octets)
    > Tag: Interworking
    > Tag: VHT Capabilities (IEEE Std 802.11ac/D3.1)
    > Tag: Vendor Specific: Apple
    > Tag: Vendor Specific: Epigram: HT Capabilities (802.11n D1.10)
    > Tag: Vendor Specific: Microsof: Unknown 8
    > Tag: Vendor Specific: Broadcom
```

*FIG. 2*

PASSIVE AND ACTIVE TECHNIQUES FOR PEOPLE-COUNTING

TECHNICAL FIELD

Teachings relate to people-counting systems as related to wireless communication with mobile devices.

BACKGROUND

Sensors can count people in a given area based on the signals that are emitted by the respective people's mobile devices, such as cell phones. People-counting systems as associated with wireless transmissions by personal mobile devices carried on persons have an interest in operating unobtrusively. Thus, to be effective, the system should ideally operate without requiring the user of the mobile device to take any action beyond being within the sensor range. This ideal is frustrated by continuous development of mobile device security and privacy standards.

BRIEF DESCRIPTION OF THE DRAWINGS

FIG. 2 is a sample network probe.

DETAILED DESCRIPTION

Disclosed herein is a technique to detect and count people in a given area. Monitoring the number of people in a given vicinity at a particular time provides actionable data to marketers, civil engineers, US presidents wishing to accurately calculate inauguration attendance, and others. Most people carry mobile devices with them wherever they go. These devices, are transmitting and receiving data constantly even without any affirmative commands from their respective owners to do so. This wireless communication operates in a pattern and can be used to count the person carrying the device. There is naturally some variance to the premise that one device=one person. In some cases, one person may carry no device, their device may be out of power, or they have their device on "airplane mode". Conversely, one person may carry multiple mobile devices, and that person would be double-counted. However, on average, each person will carry one mobile device as applicable herein.

An important aspect is that this technique operates without the user taking any affirmative action on the mobile device. The device does not have to be authorized to communicate, nor does the device require additional activation. This does generate some privacy concerns, thus, while more detailed information may be collected about a given person via this technique, the important part is merely counting that a number of devices are present, and not necessarily identifying the device "from a line-up". However, while identifying a specific device from a group of devices is not the direct aim of this technique, with some combinations of device hardware and device operating software, this will be the result.

The disclosed technique is particularly relevant to the WiFi protocol (IEEE 802.11), though may be implemented on other wireless communication protocols. Security standards for wireless communications are in regular flux. Thus methods that work to identify or isolate mobile devices have a similar level of change. Wireless communications protocols are infrequently amended (comparatively) and thus basing methods on the protocols have a greater chance of remaining viable for a longer period of time (presuming that the method does not reveal any significant vulnerability in the protocol).

For example, older models of mobile devices search for familiar wireless networks by broadcasting precisely which networks they were looking for. Thus, identifying the mobile device is trivial. The device itself broadcasts a profile of data stored thereon, and thus easily identifies itself regardless of what other information it scrambles. Newer mobile devices do not operate in such a manner because of the security/privacy risk in publically broadcasting this information.

Figure 1:
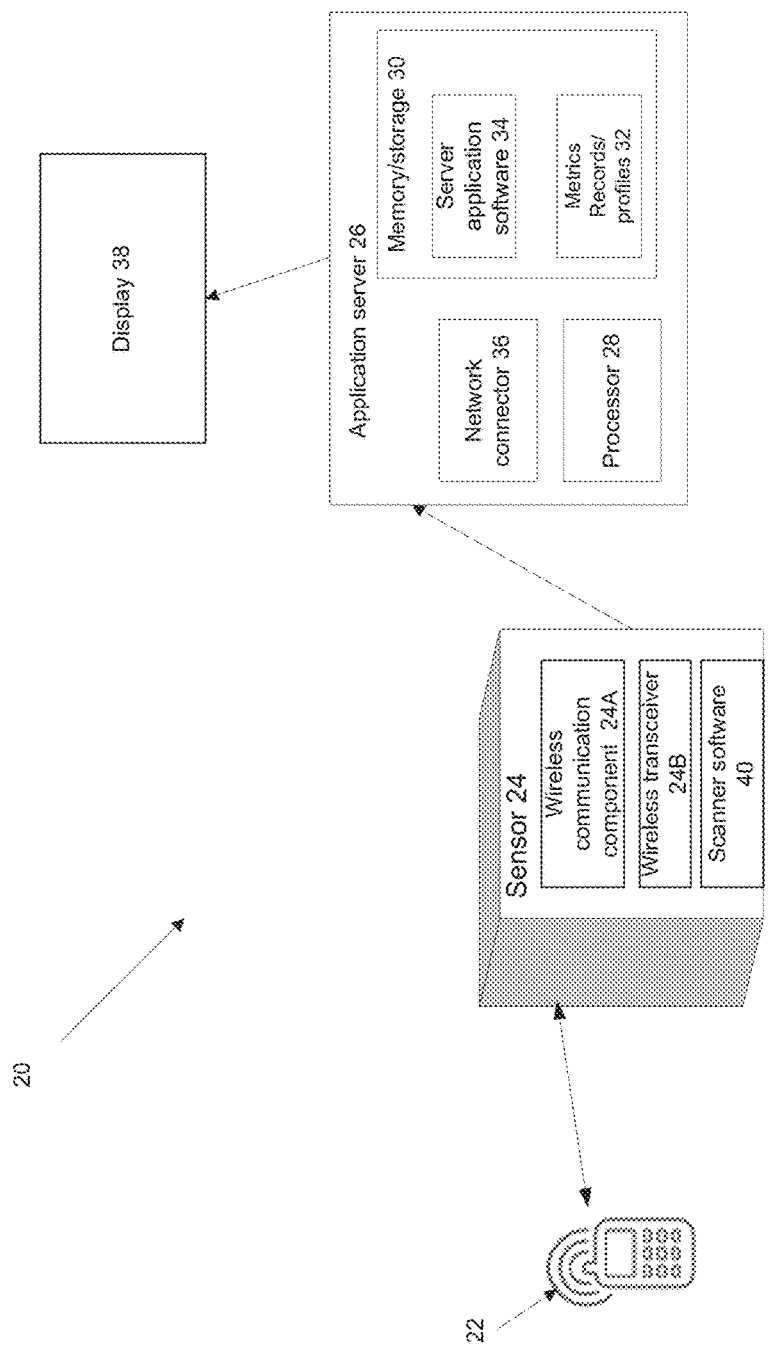
FIG. 1 is a block diagram illustrating an embodiment of a mobile detection system.

FIG. 1 is a block diagram illustrating an embodiment of mobile detection system 20. The system 20 relates to mobile devices 22 carried on a user's person. The mobile devices 22 are detected by scanners 24. Scanners 24 are detection devices or mobile stations (MS), which colloquially can be referred to as sniffers, collect identification data from mobile devices 22. Data collected by the scanners 24 is forwarded to an application server 26 via the Internet. The application server 26 includes a processor 28 and a data storage or memory 30 for logging metrics 32 and running application analytical software 34. The results of the analysis of metrics 32 are displayed or rendered to a user on a display 38.

The scanners 24 may include a number of components including a wireless communication component 24A and a wireless transceiver 24B. The wireless communication component 24A refers to any combination of a network card and a processor configured to interpret and process and generate signals received by or transmitted by the scanner 24. The wireless transceiver 24B refers to the apparatus used to communicate wirelessly and may include one or more antennas or other suitable apparatus known in the art as appropriate for the type of wireless communication desired.

Mobile devices such as cellular phones, tablets, or other portable networked devices emit signals in Bluetooth, WiFi, and cellular (i.e., 2G, 3G, 4G, Edge, H+, etc.). These signals attempt to connect to paired devices, hotspots, cell towers, or other suitable wireless connection points to greater networks ("hotspots"). In order to connect to hotspots, mobile devices send out identifying data to establish a connection.

Unsolicited data transmitted by the mobile device 22 may provide sufficient data to isolate a given device 22. Where this is not sufficient, the mobile device 22 is tricked into communicating with a scanner 24. The scanner may unobtrusively collect isolating data of the mobile device (such as an identifiable pattern in transmissions, or a machine identifier) without actually creating a connection to the device. The scanner 24 collects data in real-time on the mobile device, and by association, collects data regarding the person carrying the mobile device. This data collection occurs without alerting or impeding the carrier. Some embodiments use analytical software to determine, for example, an approaching unique ID user's presence, history, frequency of visits, duration of presence, and so on. The type of data available to the scanner 24 varies based on a number of details, such as the kind of scanner 24 used.

In some embodiments, a dashboard selects and controls data that is received from the scanners 24 at the application server 26. The dashboard can control, from a distance, data captured by the scanners 24 as well as new visitor characteristics, history of data used, the number of mobile devices that can be sensed, demographics regarding a user base, and so on.

The scanners 24 may include a plurality of sensors and communicative devices. Examples include wireless fidelity (WiFi) sensors, cell signal 2G, and Femto sensors for 3G and 4G for sensing a user's mobile device 22. The scanner 24 may include one or more antennas. In some embodiments, the scanner 24 includes one antenna for passive sensing and one antenna for active communication. The selection of antennas and configuration therewith is dependent on the intended traffic level of the scanner 24.

Mobile devices 22 emit WiFi signals automatically. In some embodiments, Cell signals (2G, 3G, 4G, etc.) emitted by a phone may be used in place of WiFi broadcasts. The scanners 24 detect this signal with an active action on a regular basis to collect the MAC address (unique ID number), SIM card number (IMSI), power of the signal, distance of mobile device 22 from scanner 24, carrier, nationality of the mobile device 22, list of applications which attempt to update, and the addresses of the web pages already open (or cached) on the mobile device 22.

Cell signal in this case refers to both CDMA and GSM type networks. While normally CDMA networks would not necessarily use mobile devices 22 with SIM cards, SIM cards exist in devices that use 4G LTE signals. Additionally, in the U.S., CDMA carriers use network-based whitelists to verify their subscribers. The mobile device 22 will still have a unique ID for the carrier to use for identification.

The scanners 24 may additionally include processors 28 for internal operations and/or for accepting some of the analytical processing load from the application server 26. Scanners 24 may also employ scanner software 40. Scanner software 40 includes program operations of the scanners 24 as well as network protocol software. Examples of network protocol software include adaptations of OpenBTS (Open Base Transceiver System) and OpenBSC (Open Base Station Controller), with additional features as taught herein. OpenBTS is stable, more complete for GSM, and has a release for UMTS (Universal Mobile Telecommunications System).

OpenBTS includes the functionality to perform complete man-in-the-middle attacks. It is worth noting that OpenBSC makes use of OpenBTS for its BTS functionalities.

Using OpenBTS software, examples of base model hardware that may be used for the scanner are adaptations of communications platforms manufactured by Ettus Research, Fairwaves, and Nuand.

For cellular signals, there are two distinguishable cases: idle mode and non-idle mode. In idle mode, the mobile device 22 performs the selection and re-selection of a base station to make sure that the mobile device 22 is attached with the best possible channel to the carrier network. In non-idle mode, a mobile device 22, with a point-to-point active call, will perform a base station handover to assure that the call is not dropped.

In order for the mobile device 22 to choose to identify itself to the scanners 24, the mobile device 22 has to reselect the cell managed by the scanners 24 and push them to identify/authenticate. A set of criteria is defined in the standard mobile phone regarding this selection/re-selection procedure. A BCCH frequency scan can be described as follows: the mobile device 22 scans a set of frequencies to detect a BCCH frequency on which to camp. Criteria for cell eligibility can be selected or re-selected. These cells include timing information. In some embodiments, every five seconds, the scanner 24 calculates the parameters for the serving cell and for non-serving cells. GSM, UTRAN, and/or LTE (2G, 3G, 4G) cell reselection is feasible. Therefore, within the scanner software 40 are programmed, unique approaches for each.

In some embodiments, the data network includes a wired data network and/or any category of conventional wireless communication networks; for example, radio, Wireless Fidelity (WiFi), cellular, satellite, and broadcasting networks. Exemplary suitable wireless communication technologies include, but are not limited to, Global System for Mobile Communications (GSM), General Packet Radio Service (GPRS), Code Division Multiple Access (CDMA), Wideband CDMA (W-CDMA), CDMA2000, IMT Single Carrier, Enhanced Data Rates for GSM Evolution (EDGE), Long-Term Evolution (LTE), LTE Advanced, Time-Division LTE (TD-LTE), High Performance Radio Local Area Network (HiperLAN), High Performance Radio Wide Area Network (HiperWAN), High Performance Radio Metropolitan Area Network (HiperMAN), Local Multipoint Distribution Service (LMDS), Worldwide Interoperability for Microwave Access (WiMAX), ZigBee, Bluetooth, Flash Orthogonal Frequency-Division Multiplexing (Flash-OFDM), High Capacity Spatial Division Multiple Access (HC-SDMA), iBurst, Universal Mobile Telecommunications System (UMTS), UMTS Time-Division Duplexing (UMTS-TDD), Evolved High Speed Packet Access (HSPA+), Time Division Synchronous Code Division Multiple Access (TD-SCDMA), Evolution-Data Optimized (EV-DO), Digital Enhanced Cordless Telecommunications (DECT), and others.

The sensors 24 can acquire data on the media access control (MAC address), signal strength, timestamp of probes received, and so on, from the mobile device. In some embodiments, the sensors can be integrated into the display device and/or placed as a separate unit collecting data metrics per location and uploading them to the central server. Additional sensors improve the accuracy of the wireless metrics as well as cover multiple areas within a location. Other sensors that can be used include Bluetooth, GSM/2G, and so on.

FIG. 2 is a sample network probe 42. Mobile devices operating in the WiFi protocol periodically transmit network probes 42 requesting local networks to respond with identification. If the mobile device recognizes the network, the device and network move to authentication procedures and form a connection. Network probes 42 are not requested, and may be received passively by nearby sensors without interaction or alerting any nearby mobile device to the presence of the sensor/sniffer. Each network probe 42 at least has a source address 44, a sequence number 46, and a capabilities list 48.

Modern combinations of device hardware and device operating software intentionally provide a fake MAC address for the source address 42. This is continually randomized with each network probe 42. The devices readily indicate that the MAC addresses are fake. The fake MAC addresses provided as a source address 44 in each network probe 42 is a security measure intended to prevent observers from identifying the specific device transmitting the network probe 42.

The list of capabilities 48 helps identify a make and model of a given mobile device. This list 48 is a part of the 802.11 protocol specification and is not faked as the source addresses 44 are. Each type of mobile device has a profile that is represented by the list of capabilities 48. A sensor may be programmed to include each of these profiles for mobile devices in circulation. Using the list of capabilities 48, received network probes 42 having disparate and fake Mac addresses are grouped/correlated by make and model of mobile device. This data alone does not provide an accurate count of devices. This is because the chance that multiple people in a given area have the same make and model of devices is high, especially for particularly popular devices.

Unlike the source address 44, the sequence number 46 of a network probe 42 is not randomized. Network probes 42 transmitted by a particular device will have consecutive sequence numbers 46. Thus despite the network probes 42 having randomized source addresses 44, the sequence numbers 46 for a series of probes 42 may be correlated. When the sequence numbers 46 of network probes 42 that have matching capabilities lists 48 (e.g., devices of the same make and model) are similar or neighboring it is likely these network probes 42 were emitted by the same device.

The terms "similar" or "neighboring" in this case are subjective and based on a desired accuracy of the particular deployment. While network probes 42 are emitted with consecutive sequence numbers 46, the sensor may not receive all the network probes 42, or process the network probes 42 in the order they were emitted. Thus, in some embodiments, the sensor correlates network probes 46 with neighboring sequence numbers 46. Consecutive sequence numbers are considered a more specific implementation of neighboring sequence numbers.

How close sequence numbers need be to determine whether the sequence numbers neighbor one another is dependent on desired accuracy and expected device detections. If the sensor is expected to track relatively few devices at a time, neighboring can refer to a relatively wide spectrum of the available values for the sequence number 46. Conversely, if the sensor is expected to detect a large number of devices at a time, then neighboring is configured to occupy a narrower range (threshold) of sequence number values.

According to the current 802.11 protocol specification, the sequence number is a 2-byte number. This means the sequence number has $2^{16}$, or 65,536 possible values to cycle through. The chance that a given mobile device is at the same or similar/neighboring location in the cycle of sequence numbers is quite low; however, when counting a large enough number of mobile devices, that chance is significant enough to cause duplicates. Despite the chance of duplicates there is some ability to differentiate. Where two separate network probes 42 have different source addresses 44, but identical sequence numbers 46 and capabilities lists 48, there are likely two devices present. This differentiation technique may be scaled to determine any number of devices in an area; however, this technique encounters issues where the frequency of network probes that are not detected is significant. Thus, differentiating based on detecting two probes that only differ by source address is not always reliable.

The technique to identify a number of devices via passive observation is to receive network probes 42 from local devices, then correlate based on sequence number 46, and capabilities list 48. Where there is a confluence of capabilities list 48 and neighboring sequence numbers 46, it is likely that a single device is emitting the network probes 42 despite having varied, random and fake MAC addresses used as the source addresses 44. This may be counted as a single device. This passive technique does not actually identify a real MAC address or any other real machine identifier for the single device—just that there exists a single device emitting network probes 42.

Figure 3:
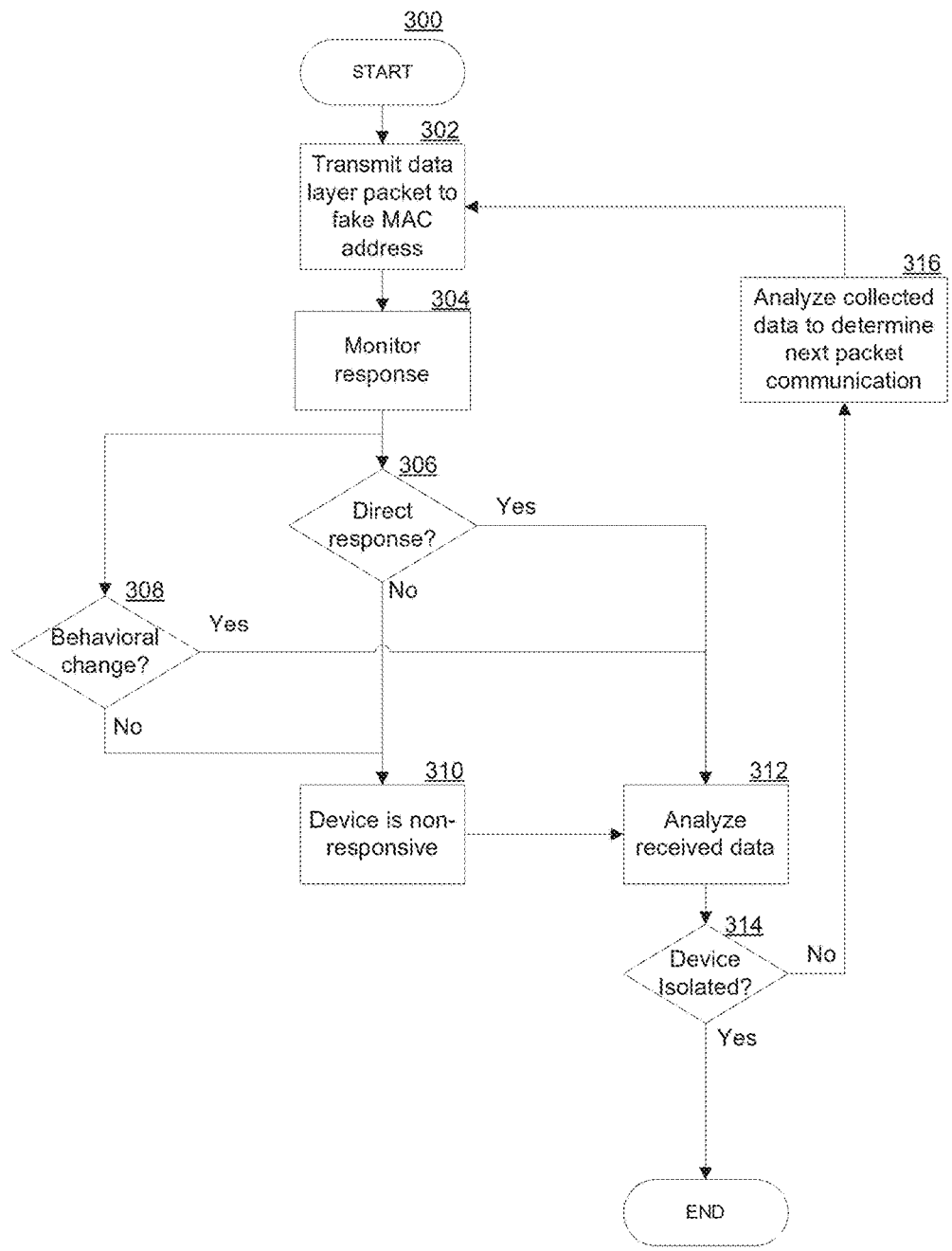
FIG. 3 is a flow diagram of a method for both actively and passively generating a signature for a mobile device.

FIG. 3 is a flowchart of an embodiment of an active method to isolate a mobile device. Use of network probes pertains to passive device isolation. Other network packets are used to perform active device isolation. Active device isolation involves soliciting a response from the mobile devices. In step 302, the scanner transmits a data link layer packet. The data link layer packet can include any of the sorts of packets interpreted at the data link layer according to protocol. Examples include RTS/CTS packets, authentication packets, and disassociation packets.

In step 304, the scanner monitors the response to the data link layer packet. In step 306, the scanner determines if there was a direct response to the data link layer packet. A direct response is a response packet or probe directed to the scanner. The direct response may include a real MAC address, some other machine identifier, or some other information regarding the behavior of a particular make and model of device. In step 308, the scanner determines whether the mobile device has exhibited any change in its respective behavior. Behavior includes (but is not limited to) the transmission of other packets, a change in the character of the network probes or the rate of the network probes emitted by the device. In step 310, where no direct response or behavioral change is observed, the scanner determines that the device is non-responsive (which is a type of a response).

In step 312, responses of all types (e.g., metadata) are analyzed by the system to determine whether the response data further isolates one device from another device that was found in the passive scan. The analysis of step 312 is not necessarily performed in isolation. The responses of a device to packets sent to a first fake MAC address (source address) are similarly compared to responses to packets sent to a second fake MAC address. This is because the communication may in fact be to the same device, or multiple devices. Transmission between the first and second fake MAC addresses may be staggered in order to properly observe (control) behavioral changes.

For example, a behavioral change in a given device is to slow the rate of network probe transmission; this change has occurred after transmitting a data link layer packet to the first fake MAC. If after transmitting the same type of packet to the second fake MAC causes no response, it is possible that there is a single device emitting network probes and the behavioral change in response to the first data link layer packet has already occurred and will not occur a second time. The behavioral responses of given makes and models of devices are testable and known. In an implementation of this system, such responses may either be pre-programmed in, or observed and iterated based on a hidden Markov model (e.g., machine learning).

In step 314, if a given device is isolated, the active scan is complete and the device may be counted based on the device signature developed (as determined by the responses to data link layer packets). In step 316, where a device was not isolated to an acceptable threshold of certainty, the system determines what sort of packet to send next to isolate a device. This determination is made based on the capabilities list as observed during passive scanning as well as the analysis of step 312. Step 316 leads back into step 302, where a new type of data link layer packet is transmitted to a selected source address. For example, if the first round involved an RTS/CTS inquiry, the second round may involve either a disassociation or authentication packet. This cycle continues until a device is isolated.

Figure 4:
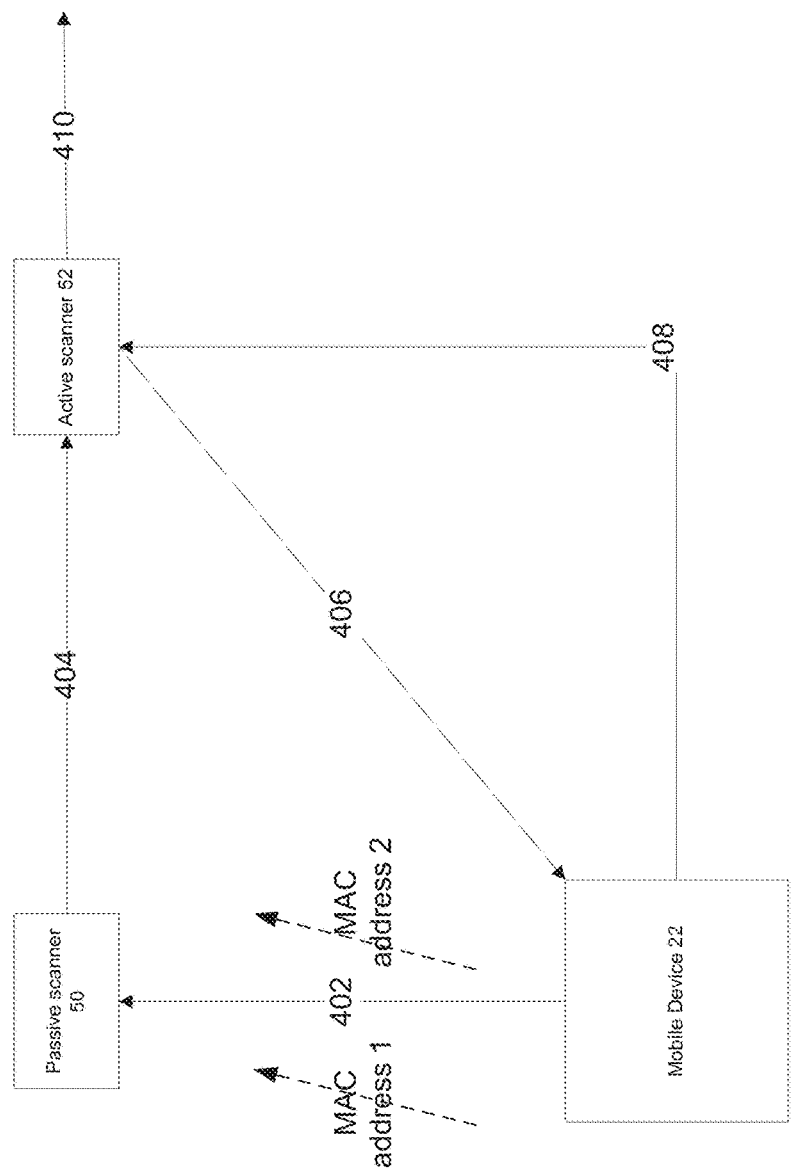
FIG. 4 is a flowchart of a method used to isolate a mobile device.

FIG. 4 is a flow diagram of a method for both actively and passively generating a signature for a mobile device. In step 402, a mobile device 22 emits network probes periodically soliciting wireless networks. The network probes are emitted using a variety of randomized MAC addresses as source addresses. The passive scanner 50 receives these network probes. The passive scanner 50 is an embodiment of the scanner 24 as discussed with reference to FIG. 1.

In step 404, the passive scanner 50 generates a signature for the mobile device based on the content of the network probes (e.g., correlating probes by capabilities list and sequence number). Groups of network probes that the passive scanner 50 determines are emitted from a single, isolated device are a passive fingerprint of that device. In step 406, the active scanner 52 transmits data layer packets to one or more of the fake MAC addresses identified in the network probes. The active scanner 52 is an embodiment of the scanner 24. The components of the passive scanner 50 and the active scanner 52 may be included in a single scanner 24, or spread across multiple scanners 24.

The data layer packets transmitted by the active scanner 52 include request channel (RTS) and clear channel (CTS) packets, authentication packets, dissociation packets, and other suitable packets for directing network traffic and communication. In step 408, the mobile device 22 responds to the data layer packets. In step 410, the response to the data layer packets is used to further enhance the isolated device signature. Steps 406 and 408 may proceed in a number of rounds including multiple packet types.

For example, a first round of 406 may include the transmission of an RTS packet. A first round of 408 may include receiving a CTS packet, no response, or an alteration in the behavior of the mobile device 22. These responses may be compared to the capabilities list of network probes that the RTS packet was sent to in order to provide context to the response. Particular makes and models of devices have predictable behaviors in response to data layer packets, thus the selection of the data layer packet and the manner in which the response thereto is interpreted is influenced by the make and model of the mobile device.

In some circumstances the CTS packet will include a real MAC address. When this occurs, the device is successfully isolated and may be counted. The device may not respond, and in this case, further rounds of steps 406/408 are used to isolate the device. Alternatively, the mobile device may react behaviorally to the RTS packet. For instance, a behavioral change includes a change in the rate of network probe generation (e.g., slower).

Changing the rate of network probe generation helps distinguish devices that coincidentally are at similar stages in a cycle of sequence numbers within their respective network probes. An alteration in the rate of network probe generation will cause the devices to diverge from one another in the sequence numbers of network probes. Where two devices of the same make and model are in the same neighborhood for sequence numbers, for example, where the most recent probes received by two devices having the same capabilities list are sequenced 1938 and 1942, a behavioral change in the device that transmitted "1942" is observed as receiving 1943, 1944, etc. a distinguishing period after the device that emitted 1938 will have emitted those same sequence numbers.

Alternatively, the specific rate of network probe generation provides identifying information. Capabilities lists are not always definitive as to make and model (depending on the make and model). Thus there may be multiple makes and models of devices that have the same capabilities list. However, monitoring the manner in which the devices respond to input can provide further identifying details in the make and model. The behavioral changes may be a result of the exact manner in which the WiFi chip or network card is implemented in the particular make and model of device. The time it takes the device to generate a new randomized fake MAC address and transmit a network probe may be indicative of the make and model and thus, though two devices may have the same capabilities list, they may be differentiated by behavioral changes, thus isolating those devices for counting.

Based on the response (or lack thereof) of the first round of steps 406 and 408, there are additional rounds of these steps. Some devices do not respond RTS/CTS inquiries, and thus other data layer packets are used. Based on the capabilities list as well as the response to the RTS/CTS inquiry, the active scanner 52 transmits an authentication or disassociation packet to the mobile device (via the fake source address). The active scanner 52 is monitoring for a similar set of responses as with the RTS/CTS inquiry: direct response, no response, or a change in behavior. Based on the sum total of the observed data from the passive observation and the multiple rounds of active observation a mobile device will be isolated. The isolation is performed by comparing the observed data to expected response profiles of known mobile devices.

Figure 5:
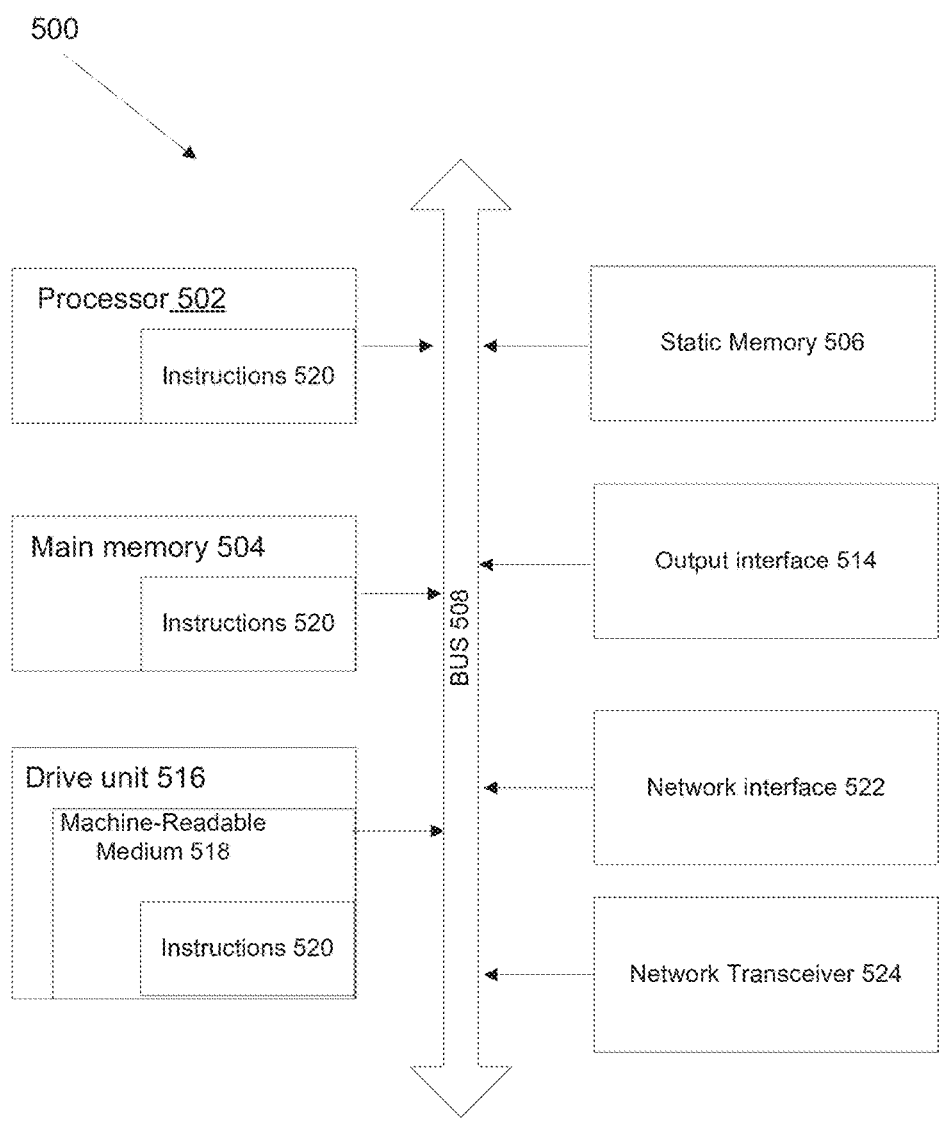
FIG. 5 is a block schematic diagram of a system in the exemplary form of a computer system within which a set of instructions for causing the system to perform any one of the foregoing methodologies and logical flows may be executed.

FIG. 5 is a block schematic diagram of a system in the exemplary form of a computer system 500 within which a set of instructions for causing the system to perform any one of the foregoing methodologies and logical flows may be executed.

The computer system 500 includes a processor 502, a main memory 504, and a static memory 506, which communicate with each other via a bus 508. The computer system 500 also includes an output interface 514; for example, a USB interface, a network interface, or electrical signal connections and/or contacts;

The disk drive unit 516 includes a machine-readable medium 518 upon which is stored a set of executable instructions, i.e., software 520, embodying any one, or all, of the methodologies described herein. The software 520 is also shown to reside, completely or at least partially, within the main memory 504 and/or within the processor 502. The software 520 may further be transmitted or received over a network by means of a network interface device 514. The computer system 500 may also include a network interface 522 and a network transceiver 524. The network interface 522 includes hardware such as a network card, network controller, or WiFi card. The network transceiver 524 includes hardware such as antennas or other suitable signal receiving and transmitting apparatus.

In contrast to the system 500 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g., a computer. For example, a machine-readable medium includes read-only memory (ROM); random access memory (RAM); magnetic disk storage media; optical storage media; flash memory devices; electrical, optical, acoustical or other form of propagated signals such as carrier waves, infrared signals, digital signals, etc.; or any other type of media suitable for storing or transmitting information.

Further, it is to be understood that embodiments may include performing operations and using storage with cloud computing. For the purposes of discussion herein, cloud computing may mean executing algorithms on any network that is accessible by internet-enabled or network-enabled devices, servers, or clients, and that do not require complex hardware configurations (e.g., requiring cables and complex software configurations, or requiring a consultant to install). For example, embodiments may provide one or more cloud computing solutions that enable users, e.g., users on the go, to access real-time video delivery on such internet-enabled or other network-enabled devices, servers, or clients in accordance with embodiments herein. It further should be appreciated that one or more cloud computing embodiments include real-time video delivery using mobile devices, tablets, and the like, as such devices are becoming standard consumer devices.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

The invention claimed is:

1. A method of identifying a mobile device via wireless communication comprising:
   passively receiving, by a network sensor, network probes from mobile devices;
   grouping, by the network sensor, network probes that include matching device capabilities and neighboring sequence numbers;
   transmitting channel request packets to a fake machine identifier as indicated in the network probes;
   recording a first response to the channel request packets;
   generating, metadata associated with the grouping of network probes based on the first response and
   isolating, by the sensor, a mobile device based on the grouping of network probes and said metadata.

2. The method of claim 1, further comprising:
   performing any of:
     transmitting an authentication packet to the fake machine identifier; or
     transmitting a disassociation packet to the fake machine identifier;
   recording a second response to either of the authentication or disassociation packets; and
   updating, the metadata based on the second response.

3. The method of claim 2, wherein determining what packets to transmit to the fake machine identifier amongst authentication or disassociation packets is determined by any of:
   device capabilities specified in network probes associated with the fake machine identifier; or
   the first response.

4. The method of claim 1, wherein the metadata includes a real machine identifier.

5. The method of claim 1, wherein the metadata includes a pattern of generation of fake machine identifiers by the mobile device.

6. The method of claim 1, wherein neighboring sequence numbers are determined as those within a threshold distance of one another.

7. The method of claim 1, wherein neighboring sequence numbers are determined as those sequence numbers that are arranged consecutively.

8. The method of claim 1, further comprising:
   transmitting packets to machine identifiers indicated in the network probes based on the device capabilities indicated in corresponding network probes.

9. A system for identifying a mobile device via wireless communication comprising:
   a wireless transceiver configured to passively receive network probes from mobile devices, wherein the wireless transceiver is further configured to transmit channel request packets to a fake machine identifier as indicated in the network probes and to detect and record a first response to the channel request packets and to generate metadata associated with the grouping of network probes based on the first response and the identification of a mobile device is further based on said metadata; and
   a wireless communications component configured to group network probes that include matching device capabilities and neighboring sequence numbers and identifying a mobile device based on the grouping of network probes.

10. The system of claim 9, wherein the wireless transceiver is further configured to transmit any of an authentication packet or a disassociation packet to the fake machine identifier and detect and record a second response to either of the authentication or disassociation packets and wherein the wireless communications component is further configured to update the metadata based on the second response.

11. The system of claim 10, wherein determining what packets to transmit to the fake machine identifier amongst authentication or disassociation packets is determined by any of:
   device capabilities specified in network probes associated with the fake machine identifier; or
   the first response.

12. The system of claim 9, wherein the metadata includes a real machine identifier.

13. The system of claim 9, wherein the metadata includes a pattern of generation of fake machine identifiers by the mobile device.

14. A method to identify a mobile device seeking wireless networks comprising:
   receiving, by a sensor, network probes emitted by local mobile devices including multiple imitation MAC addresses;
   transmitting channel request packets to imitation MAC addresses as indicated in the network probes;
   identifying a make and a model of the mobile device based on the network probes;

correlating network probes having a same make and model based on a sequence number of the network probes;

recording first responses to the channel request packets associated with each of the corresponding imitation MAC addresses to which channel request packets are transmitted to;

generating, metadata associated with each of the correlated groups of network probes based on the first response; and identifying a number of mobile devices within range of the sensor based on a number of correlated groups of network probes and said metadata.

15. The method of claim 14, further comprising:

performing any of:

transmitting an authentication packet to the imitation MAC addresses; or transmitting a disassociation packet to the imitation MAC addresses;

recording second responses to either of the authentication or disassociation packets associated with each of the corresponding imitation MAC addresses to which authentication or disassociation packets are transmitted to; and updating, the metadata based on the second responses.

16. The method of claim 15, wherein determining what packets to transmit to the imitation MAC addresses amongst authentication or disassociation packets is determined by any of:

device capabilities specified in network probes associated with a corresponding imitation MAC addresses; or the first responses.

17. The method of claim 14, wherein the metadata includes a real MAC address.

18. The method of claim 14, wherein the metadata includes a pattern of generation of imitation MAC addresses by the local mobile devices.

* * * * *